United States Patent Office 2,917,467
Patented Dec. 15, 1959

2,917,467

ALKOXYPOLYSILOXANES

Melvin M. Olson, Minneapolis, Minn., and Roger M. Christenson, Richland Township, Pa., assignors to Pittsburgh Plate Glass Company No Drawing. Application November 23, 1954
Serial No. 470,821

2 Claims. (Cl. 260—2)

This invention relates to mixed alkoxysiloxanes and to alkoxypolysiloxanes, said mixed alkoxysiloxanes and said alkoxypolysiloxanes containing long chain monohydric alcohol residues. More particularly, the invention relates to the mixed alkoxysiloxanes and to alkoxypolysiloxanes which contain alkoxy groups derived from a drying or semidrying glyceride oil, said alkoxysiloxanes and alkoxypolysiloxanes being adapted for application as films to solid surfaces, and when so applied being adapted to dry to a hard, adherent, durable state.

It has heretofore been suggested to form orthosilicates of higher secondary alkyl alcohols containing relatively long aliphatic hydrocarbon groups. In many instances, the alcohols employed in forming these orthosilicates were free of ethylenic groups and especially of ethylenic groups associated together in such manner as to impart drying properties. The resultant products were liquids of high boiling point and low freezing point and were adapted for use in hydraulic systems, such as vehicle braking systems, shock absorbers, and the like. They were also useful as lubricants and as plasticizers. One of their characterizing features was very high resistance to hydrolysis. The materials have not been useful as coating media.

It has also been suggested to prepare orthosilicates of alcohols derivable by reduction of fatty acids of various glyceride oils. These could be applied as films to solid surfaces and dried by air or by baking, but they were objectionable as they tended to become soft and tacky when they were aged a short time.

It has now been discovered that useful alkoxypolysiloxanes embodying long chain alcohols, at least some of which are ethylenically unsaturated and preferably contain a plurality of ethylenic groups, can be prepared. In accordance with this invention, orthosilicates embodying the residues of the foregoing alcohols together with residues of lower monohydric alcohols can be hydrolyzed subsequently to, or concurrently with, their formation in order to provide polysiloxanes which are adapted for use as coating media and when so employed can be baked to provide adherent and durable films.

One class of higher alcohols useful in the practice of the present invention comprises such alcohols as may be derived by the sodium reduction of esters of fatty acids from glyceride oils, such as soya oil, linseed oil, cotton seed oil, safflower oil, castor oil and dehydrated castor oil, tung oil, oiticica oil, and the like. Appropriate esters comprise methyl esters, ethyl esters and esters of various other monohydric alcohols and said fatty acids. The esters of the fatty acids and polyhydric alcohols, such as glycol, glycerol and others may also be employed. The acids usually occur as mixtures including some saturated acids, such as stearic acid, palmitic acid, some monoethylenic acids such as oleic acid, and some acids one or more of which contain a plurality of double bonds, such as linoleic acid, linolenic acid, dehydrated castor oil acid, elaeostearic acid, and licanic acid. Acids from fish oil, including clupanodonic acid, are also embraced within the group.

If desired, the unsaturated acids can be separated out from the saturated acid, or at least can be concentrated by well known techniques, such as distillation or liquid fractionation, in order to increase the degree of unsaturation. However, in many instances, the acid mixtures as obtained by hydrolysis of the oil can be employed without separation but after esterification in the preparation of higher unsaturated alcohols useful in the practice of the present invention. Probably the most economical technique of preparing long chain unsaturated alcohols involves sodium reduction of the glyceride oils per se.

Naturally, the carboxyls of the fatty acids, as esters, should be reduced to hydroxyls by appropriate techniques, such as by sodium reduction or by other methods of reduction, which selectively convert the carboxyls, as esters, to the desired hydroxyls without excessively affecting the degree of unsaturation of the hydrocarbon chains.

If desired, monohydric glycerides or other monohydric esters of drying oil fatty acids and polyhydric alcohols may be employed as the higher alcohol component in the preparation of the alkoxysiloxanes and alkoxypolysiloxanes of this invention. The partial alcoholysis of glyceride oils and other esters of polyhydric alcohols and fatty acids, in order to form monohydric glycerides or esters of other polyhydric alcohols, is a well known technique and need not be described at this time.

The formation of alkoxysiloxanes and alkoxypolysiloxanes of the higher alcohols may be conducted by various methods. One convenient method comprises heating a mixture of a higher alcohol and a lower orthosilicate containing, for example, from about 1 to about 6 carbon atoms in the hydrocarbon chains of the alkoxy groups. Ethyl orthosilicate constitutes one example of such orthosilicate; n-propyl orthosilicate and n-butyl orthosilicate are others which may be used. The silicates of those alcohols which are relatively water soluble, may conveniently be employed. Preferably, the orthosilicate and the higher alcohols are heated together in the presence of a catalyst of ester interchange, such as litharge or other appropriate catalyst of interchange reaction. The reaction is usually not conducted to such degree as to replace all of the lower alcohol residues. Preferably, the reaction is so controlled as for example by limiting the amount of the higher alcohol to be substituted in the ester linkage as to replace about 50 percent of the lower alcohol groups. This percentage is susceptible of substantial variation, however.

The mixed orthosilicate as thus obtained can be converted into alkoxypolysiloxanes containing the hydrocarbon residues of the higher alcohols by an appropriate process of hydrolysis with water in a manner which is well understood in the art. In such hydrolysis, it is preferred to employ water in an amount just sufficient to hydrolyze the residual lower molecular weight alkoxy groups to siloxane linkages.

A method which is often more convenient for the formation of the alkoxypolysiloxanes, embodying higher alcohols for use as coating agents in accordance with the provisions of the present invention comprises heating a silicon tetrahalide, such as silicon tetrachloride, in the presence of an alcohol or an alcohol mixture and a carboxylic acid. This method is elaborated upon in a copending application Serial No. 384,762, filed by the present inventor and another October 7, 1953. In accordance with this method, silicon tetrachloride is mixed with a lower alcohol in the presence of a free carboxylic acid, such as acetic acid. Preferably, the addition of the alcohol is effected relatively slowly and with agitation. Hydrogen chloride is evolved and may be removed by passage of a dried combustion gas or other nonreactive gas through the mixture. Subsequently the reaction product is heated to drive off volatile constituents, which operation may be facilitated by application of vacuum. Ester interchange with the higher alcohol is then conducted. This method may be applied to the preparation of polysiloxane esters of alcohols derived by the sodium reduction of higher fatty acids or the monohydric esters, such as the diglycerides of fatty acids.

The polysiloxane esters, with or without diluents such as xylene or toluene, can be applied to various surfaces such as steel, iron, copper, brass, aluminum or the like, and baked at temperatures of about 300° F. to 500° F., and preferably about 400° F., for a period sufficient to convert the alkoxypolysiloxane component into a hard, adherent and chemically resistant state.

The present invention is not limited to the post-hydrolysis of the alkoxysiloxanes containing higher alcohol radicals of the type previously described; on the contrary, it is also quite feasible partially to hydrolyze an orthosilicate ester of a lower alcohol, such as ethyl alcohol or butyl alcohol, to provide an alkoxypolysiloxane in which there are a number of residual ester linkages from the lower alcohol still present in the siloxane chain. These groups can, under the provisions of the present invention, be replaced by ester interchange reaction with a higher alcohol, such as one of the alcohols from sodium reduction of a fatty acid ester, or a monohydric glyceride or other monohydric ester derived from esterification of a polyhydric alcohol and a higher fatty acid, such as drying oil fatty acid.

As will be apparent from the subsequent examples, the operations of hydrolysis and ester interchange may be conducted concurrently by appropriately refluxing a mixture of an orthosilicate of a lower alcohol, a higher alcohol containing the hydrocarbon portion of a fatty acid (preferably a drying oil fatty acid), water and an appropriate ester interchange catalyst, such as litharge.

The compounds of this invention may be represented by the formula:

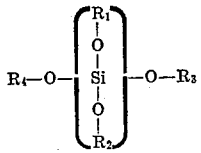

where $R_1$ and $R_2$ are the alcohols resulting from reduction of the carboxyls of drying oil acids or are diglycerides of said acids and $R_3$ and $R_4$ are lower alkyl groups of 1 to 6 carbon atoms or repetitions of the group:

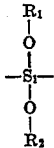

where $R_1$ and $R_2$ have the above significance.

The preparation of valuable alkoxypolysiloxanes and alkoxysiloxanes suitable for use as coating media is illustrated by the following examples.

*Example I*

In this example, alcohols derived by the sodium reduction of soya oil acids were caused to undergo ester interchange and concurrently, hydrolysis of the ethoxy group is effected to produce alkoxypolysiloxane containing soya alcohol and hydrocarbon residues. The reaction mixture comprised:

| | |
|---|---|
| Ethyl orthosilicate | 52 grams (¼ mole). |
| Soya alcohols | 129 grams (¼ mole). |
| n-Butyl alcohol | 74 grams (1 mole). |
| Water | 4½ grams (¼ mole). |
| Litharge (ester interchange catalyst) | 0.09 gram. |

In the foregoing mixture, the n-butyl alcohol constituted a solubilizing agent rendering the mixture homogeneous. The litharge was used as an ester interchange catalyst.

The foregoing mixture was refluxed for 3 hours and then distilled until 119 grams of volatiles were distilled off. The residue constituting the desired product was a light yellow liquid weighing 133.2 grams. The product was an alkapolyenyloxypolysiloxanes in which the alkapolyenyloxy groups were of the alcohols from soya acids. This liquid was soluble in solvents, such as xylene and toluene, and could be mixed with alkyd resins containing fatty acid components as modifiers. The material could be spread on panels or other objects of iron, steel, or the like and baked at a temperature of about 200° C. to provide a hard film resistant to softening or aging.

*Example II*

In accordance with this example, n-butoxypolysiloxane was first prepared and this was then caused to undergo ester interchange with a diglyceride of linseed oil. In the initial reaction mixture, n-butanol was employed as a solubilizing agent to attain homogeneity. The reaction mixture comprised:

| | |
|---|---|
| n-Butyl orthosilicate | 77.7 grams (0.242 mole). |
| Water | 4.35 grams (0.242 mole). |
| n-Butanol | 98 grams. |
| Glacial acetic acid | 1 milliliter. |

In order to form the n-butoxypolysiloxane the foregoing mixture was refluxed for a period of about 24 hours. The n-butanol was then distilled off, leaving a residue of 53.5 grams, which was largely n-butoxypolysiloxane. To 53.5 grams of this residue was added 300 grams of linseed oil diglyceride of a hydroxyl value of 88.5. The mixture was stirred and heated up to a temperature of 170° C. to 180° C. to remove butanol. Vacuum was then applied to the system and butanol began to distill at a pot temperature of 140° C. indicating that ester interchange reaction was occurring. When this was completed, a light brown residue was obtained which was soluble in xylene and toluene. The residue was largely an alkoxypolysiloxane in which the alkoxy groups were of the linseed oil diglyceride. Films of this material were baked upon sheet steel test panels at 400° F. for 60 minutes and possessed excellent mar resistance and an impact value of 48 inch/pound.

In the reaction of this example, the orthosilicate of the lower alcohol was converted into an alkoxypolysiloxane of a lower alcohol before the ester interchange reaction.

*Example III*

The present example is a further illustration of the preparation of an alkoxypolysiloxane containing a partial ester of a polyhydric alcohol and a fatty acid. In the preparation of this material, the polysiloxane derivative of the lower alcohol was prepared by the partial hydrolysis of the corresponding orthosilicate of the lower alcohol as a preliminary to the ester interchange reaction with the higher alcohol. The higher alcohol was a partial glyceride.

This reaction is also characterized by concurrent esterification of silicon tetrachloride and hydrolysis to form the polysiloxane.

A mixture was prepared comprising:

| | |
|---|---|
| Silicon tetrachloride | 85.6 grams (½ mole). |
| n-Butyl alcohol | 185 grams (2½ moles). |

The foregoing mixture was refluxed for ½ hour and cooled to 25° C. at which temperature 5 milliliters of glacial acetic acid was added, along with 9 grams (½ mole) of water and 100 grams of n-butanol constituting a solubilizing agent.

The mixture was refluxed for 2 and ½ hours, left to stand overnight and was again refluxed for 7 hours. The n-butanol was removed under reduced pressure leaving a residue of n-butoxypolysiloxane.

To the resultant n-butoxypolysiloxane obtained was added 238 grams of a diglyceride of linseed oil having a hydroxyl value of 172. The mixture was heated to a pot temperature of 190° C. in order to remove liberated n-butanol.

The resultant polysiloxane containing linseed diglyceride residues was a liquid material, soluble in xylene and toluene. Films thereof were applied to test panels of sheet steel and were baked to hard films at 400° F. over a period of 60 minutes. The films were hard and of excellent mar resistance.

In Examples II and III the diglyceride esters of the higher fatty acids could be replaced by stoichiometrically equivalent amounts of the monohydric esters of the corresponding fatty acids and higher alcohols, such as pentaerythritol.

In the several Examples I and IV, alcohols from reduction of free fatty acids, such as linoleic acid, linolenic acid, and elaeostearic acid, may be substituted for those mixed acids of soya oil.

*Example IV*

In accordance with the provisions of this example, an alkoxypolysiloxane containing unsaturated residues of fatty acid is prepared directly from silicon tetrachloride and the alcohols in the presence of a carboxylic acid in the manner disclosed in the foregoing application, Serial No. 384,762. The reaction mixture comprises approximately equal moles of silicon tetrachloride, glacial acetic acid and 3 moles of the alcohol component. The latter may comprise alcohols from the sodium reduction of soya oil fatty acids together with n-butanol in an amount to provide a compatible mixture. The alcohols and the glacial acetic acid are added to the silicon tetrachloride while chilled, for example upon an ice water bath. The glacial acetic acid and the alcohol component preferably are added relatively slowly over a period of about 4 hours. The reaction mixture should be vigorously agitated and preferably is swept with a non-reactive gas, such as carbon dioxide or nitrogen, in order to remove volatile hydrogen chloride. Subsequently, the mixture may be heated on a steam bath and volatile materials distilled off under reduced pressure. The product is an alkapolyenyloxypolysiloxane containing the hydrocarbon chains of the reduced fatty acids in the alkoxy groups.

The forms of the invention herein described are illustrative embodiments. It will be realized by those skilled in the art that numerous modifications may be made therein without departure from the spirit of the invention or the scope of the appended claims.

We claim:

1. A method of forming a resin which dissolves in xylene to form a liquid coating material, which method comprises refluxing at the temperature of ester interchange in the presence of an ester interchange catalyst a mixture of (A) water, (B) an orthoalkyl silicate in which the alkyl groups contain from 1 to 6 carbon atoms, and (C) an alcohol of the class consisting of an alkapolyenyl alcohol of 18 to 22 carbon atoms and a diglyceride of a drying oil acid, there being present about 2 moles of compound (C) for every mole of compound (B), to evolve by ester interchange, an alkyl alcohol containing 1 to 6 carbon atoms refluxing being continued until said alcohol ceases to evolve and said resin is formed and then discontinuing the heating operation while said resin is soluble in xylene.

2. A polysiloxane resin which is soluble in xylene and is adapted to be spread as a film and when so spread and then baked, to dry to a hard, durable film, the silicon atom of said polysiloxane resin having attached thereto on the average about two moieties per silicon atom and said moieties being selected from the group consisting of alkapolyenyl moieties having 18 to 22 carbon atoms and moieties obtained by removing the hydrogen atom of the glyceryl hydroxyl group in a drying oil fatty acid diglyceride, said moieties being substantially the only organic moieties in the polysiloxane resin.

References Cited in the file of this patent

UNITED STATES PATENTS

| | | |
|---|---|---|
| 2,395,550 | Iler | Feb. 26, 1946 |
| 2,438,736 | Barry | Mar. 30, 1948 |
| 2,490,691 | Langkammerer | Dec. 6, 1949 |
| 2,566,957 | Pedlero et al. | Sept. 4, 1951 |
| 2,657,149 | Iler | Oct. 27, 1953 |
| 2,711,418 | Kather et al. | June 21, 1955 |

OTHER REFERENCES

Falkenburg et al.: Journal Amer. Chem. Soc., vol. 69, March 1947, pp. 486 and 487. Copy in Scientific Library.

Szmant: Organic Chemistry, Prentice-Hall, 1957, pp. 76, 79, 80, 305 and 306. (Copy in Scientific Library.)

UNITED STATES PATENT OFFICE

CERTIFICATE OF CORRECTION

Patent No. 2,917,467 December 15, 1959

Melvin M. Olson et al.

It is hereby certified that error appears in the printed specification of the above numbered patent requiring correction and that the said Letters Patent should read as corrected below.

Column 3, line 71, for "(¼ mole)" read -- (½ mole) --.

Signed and sealed this 4th day of October 1960.

(SEAL)
Attest:

KARL H. AXLINE
Attesting Officer

ROBERT C. WATSON
Commissioner of Patents